Dec. 28, 1965     A. S. ROSENFELD     3,226,190
RECOVERY PROCESS FOR CALCIUM-BASE SULFITE SPENT LIQUOR
Filed Sept. 5, 1961
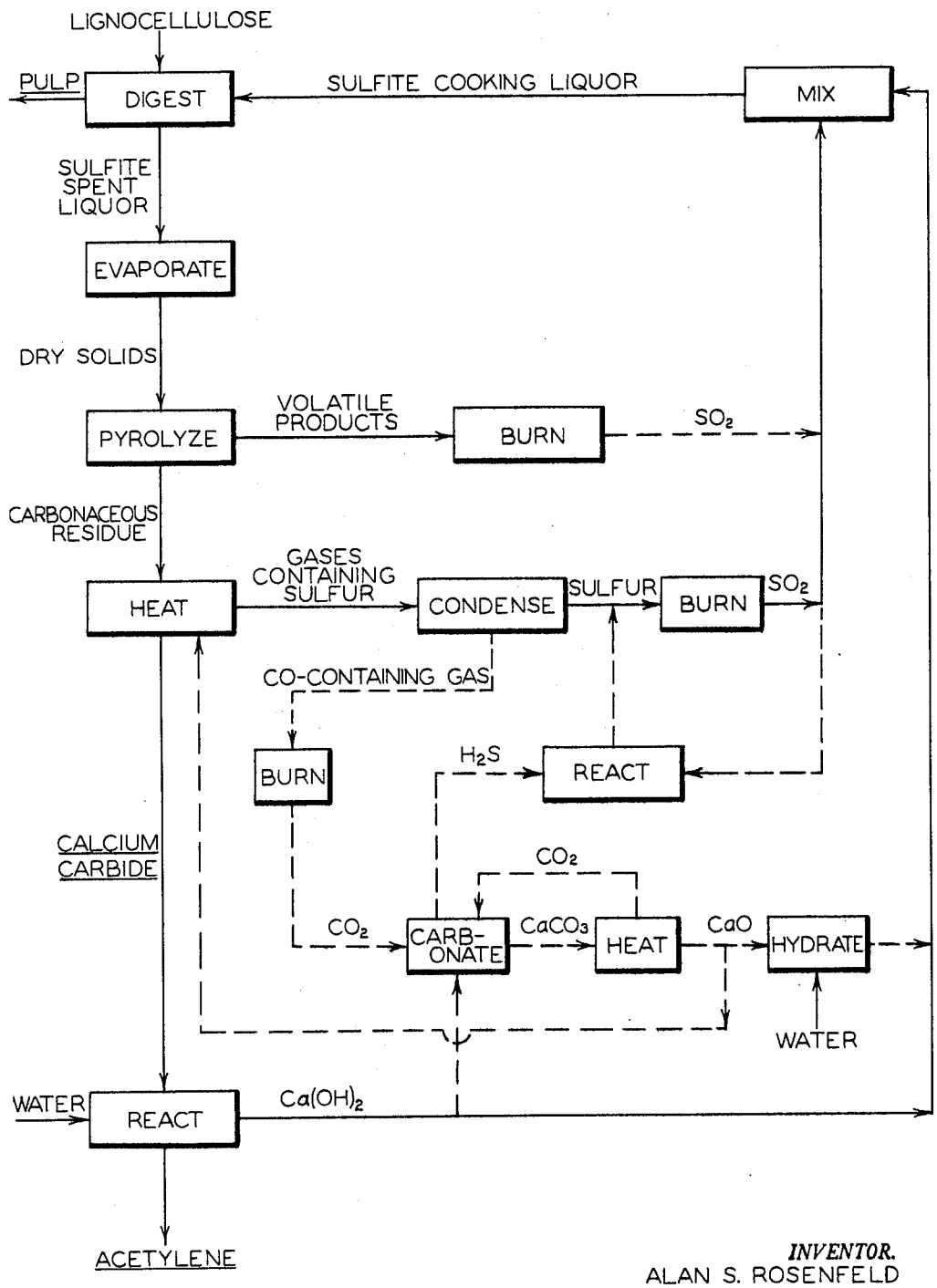
INVENTOR.
ALAN S. ROSENFELD
BY J. P. Zegler
AGENT United States Patent Office 3,226,190
Patented Dec. 28, 1965

3,226,190
RECOVERY PROCESS FOR CALCIUM-BASE
SULFITE SPENT LIQUOR
Alan S. Rosenfeld, Portland, Oreg., assignor to Crown
Zellerbach Corporation, San Francisco, Calif., a corporation of Nevada
Filed Sept. 5, 1961, Ser. No. 136,053
5 Claims. (Cl. 23—131)

This invention relates to a process of pulping lignocellulose by the calcium-base sulfite process. More particularly, the present invention relates to a process for the production of valuable chemicals from a sulfite spent liquor containing calcium as a base and to the recovery of calicum and sulfur in such forms that they are suitable for the preparation of fresh calcium-base sulfite cooking liquor for use in a succeeding pulping cycle.

In the calcium-base sulfite process for pulping lignocellulose materials, such as wood or agricultural residues, the lignocellulose in the form of small pieces is cooked under pressure with an aqueous liquor containing calcium bisulfite and frequently free sulfurous acid. During pulping of the lignocellulose, the cooking liquor reacts preferentially with lignin and after the digestion of the lignocellulose is completed, the resulting cellulosic pulp is separated from the liquor. The separated liquor is known in the art as sulfite spent liquor. Such liquor contains an aqueous solution of lignin compounds, wood sugars and inorganic compounds of calcium. While many attempts have been made to provide a commercially feasible and economical process for the recovery of chemicals from calcium-base sulfite spent liquor, such attempts have not been entirely successful. For instance, in attempting to burn the combustible content of calcium-base sulfite spent liquor, a portion of the inorganic chemicals combines in the form of calcium sulfate which is not usable in the pulping procedure. Accordingly, it has been the common practice for a number of years to discharge calcium-base sulfite spent liquors into streams, thereby causing a serious public nuisance as well as a loss of valuable chemicals. In recent years the pollution of streams by pulping spent liquors became an important consideration and various government authorities have stipulated that the pollution brought about by the pulping spent liquors must be greatly reduced or eliminated.

With the foregoing problem in mind, I have found that it is possible, simultaneously with the recovery of the essential pulping chemicals, i.e. sulfur and calcium compounds to recover economically calcium carbide or acetylene without disturbing the chemical balance in the recovery process.

It is the general object of this invention to provide a cyclic process for the recovery of inorganic chemicals from calcium-base sulfite spent liquor, while producing concurrently valuable chemical products having a wide variety of commercial applications.

It is another object of this invention to provide a cyclic process of recovering chemicals from calcium-base sulfite spent liquor, wherein the recovered chemicals can be combined to produce a high quality fresh sulfite cooking liquor for use in the pulping process.

It is still a further object of this invention to provide an improved calcium-base sulfite pulping process which includes a substantially complete recovery of inorganic pulping chemicals, recovery of heat values, and production of acetylene as commercially valuable chemical product.

Other objects and advantages of the process of this invention will be apparent from the specification and drawing wherein the cyclic recovery process of this invention is represented as a flow diagram.

Broadly stated, the present invention comprises a process wherein calcium-base sulfite spent liquor is evaporated to produce substantially dry solids. The resulting dry solids are pyrolyzed to produce a carbonaceous solid residue. The pyrolysis is effected under controlled conditions so as to produce a residue containing carbon and calcium compounds in such proportions as to insure a substantially complete conversion of the calcium compounds to calcium carbide. The carbonaceous residue is thereafter heated at an elevated temperature to form calcium carbide and a gaseous mixture containing elemental sulfur in vaporized form. The calcium carbide is separated and reacted with water to produce acetylene which is recovered and an aqueous slurry containing calcium hydroxide. The gaseous mixture is cooled to condense the elemental sulfur which is separated and burned in the presence of an oxygen-containing gas to form sulfur dioxide. The sulfur dioxide thus formed is admixed with the aqueous slurry containing calcium hydroxide, thereby producing fresh sulfite cooking liquor for use in a succeeding pulping cycle.

If desired, the recovery system described hereinabove may be supplemented by burning the volatile products from the pyrolysis step thereby converting them to a gas containing sulfur dioxide which may be employed in the preparation of fresh cooking liquor.

Also, if it is desired to purify calcium hydroxide produced during the generation of acetylene, carbon dioxide-containing gas may be passed through the calcium hydroxide aqueous slurry thereby producing calcium carbonate and hydrogen sulfide. The calcium carbonate may then be heated to convert it to calcium oxide which may be admixed with water to form an aqueous slurry of purified calcium hydroxide. The hydrogen sulfide produced during the carbonation step may be reacted with sulfur dioxide to produce elemental sulfur which may then be burned in the presence of oxygen-containing gas to produce sulfur dioxide, the latter being utilized in the preparation of fresh sulfite cooking liquor. Furthermore, if desired, a portion of calcium oxide produced by heating calcium carbonate may be admixed with the carbonaceous residue and the resulting mixture may be processed for the preparation of calcium carbide as indicated hereinabove.

The carbon dioxide-containing gas employed in the carbonation of calcium hydroxide may be obtained by burning noncondensable carbon monoxide-containing gas liberated after separation of condensed elemental sulfur, thereby converting carbon monoxide to carbon dioxide.

The process of this invention will now be described in detail in connection with the flow diagram shown in the drawing.

As has been indicated above, the calcium-base sulfite spent liquor which is a starting material for the presently described recovery process is derived from the conventional acid sulfite pulping process in which an aqueous liquor containing calcium bisulfite and sulfurous acid is employed for digestion of lignocellulose material. After the sulfite spent liquor is separated from the cellulosic pulp produced, it usually has a solids content of about 10%. In accordance with this invention, the liquor is first concentrated in conventional evaporators to a solids content of about 50%, then further evaporated in any suitable drying apparatus, such as a drum dryer, in which most of the remaining portion of water is driven off to produce substantially dry solids having approximately 10% moisture content. The resulting dry solids are pyrolyzed in a suitable furnace at a temperature between about 700° C. and about 1200° C., preferably between about 800° C. and about 1000° C. for a period sufficient to produce a solid carbonaceous residue comprising carbon, sulfur and calcium compounds, the amount of carbon in said residue being at least sufficient for subsequent conversion of substantially all of the calcium compounds to calcium carbide. A certain amount of auxiliary fuel and oxygen-containing gas, such as air, may be introduced into the pyrolyzing zone in order in enhance the carbonization of the sulfite liquor solids. The volatile products formed during the pyrolysis may be burned in the presence of an oxygen-containing gas to produce a gas containing predominantly sulfur dioxide which may be cooled and directed to a mixing tank containing an aqueous slurry of calcium hydroxide for absorption thereof in the preparation of fresh sulfite cooking liquor.

The solid carbonaceous residue contains a mixture of carbon and inorganic calcium compounds. As mentioned hereinabove, the pyrolysis of the dry solids of sulfite spent liquor must be effected under controlled conditions so that a proper stoichiometric balance as required for the reaction between carbon and calcium compounds is insured. In this manner, substantially all of the calcium compounds present in the carbonaceous residue will be converted to calcium carbide. Although the carbon may be present in the residue in an excess of the amount required for the reaction with calcium compounds, it is preferred that the amount of carbon in the carbonaceous residue be substantially equivalent to that required for the conversion of the calcium compounds to calcium carbide.

The carbonaceous residue next is fed into a suitable furnace, such as an electric arc furnace, where it is heated in a reaction zone maintained at an elevated temperature of at least 2500° C., preferably between about 2700° C. and 2900° C. in a reducing atmosphere for a period sufficient to form calcium carbide. During the reaction, a gaseous mixture containing vaporized elemental sulfur is released from the reaction zone and passed to a suitable condensing apparatus where it is cooled, elemental sulfur condensed and thereafter separated by any suitable means from the noncondensable gas containing predominantly carbon monoxide. The condensed elemental sulfur is burned in the presence of a free oxygen-containing gas to produce sulfur dioxide which is admixed with calcium hydroxide aqueous slurry to produce fresh sulfite cooking liquor for use in the pulping of a new quantity of lignocellulose.

The calcium carbide produced is cooled, ground to a suitable particle size and mixed with water in a reaction zone which is maintained at a temperature below about 100° C. In the course of the reaction, substantially all of the calcium carbide is converted into acetylene which is withdrawn from the reaction zone, while a calcium hydroxide-containing aqueous slurry is obtained as a co-product of the reaction. This slurry is directed to a suitable mixing vessel where it is admixed with sulfur dioxide produced from the condensed elemental sulfur as described hereinabove.

Thus, the calcium hydroxide-containing aqueous slurry may be employed directly in the preparation of fresh sulfite cooking liquor. However, if it is desired to employ calcium hydroxide of high purity, the calcium hydroxide-containing aqueous slurry derived from the acetylene generation stage may be carbonated with sufficient carbon dioxide containing gas to convert substantially all of the calcium hydroxide to calcium carbonate. During the carbonation reaction, a certain amount of hydrogen sulfide is formed as a result of a reaction between hydrogen ions and sulfur compounds present as an impurity in the calcium hydroxide-containing aqueous slurry. The liberated hydrogen sulfide gas may be reacted with sulfur dioxide thus producing elemental sulfur which may be combined with the elemental sulfur obtained from the sulfur condensation stage referred to hereinabove and burned to produce sulfur dioxide. As an alternative procedure, hydrogen sulfide may be burned directly to sulfur dioxide in a suitable oxidizing apparatus into which air is admitted.

The calcium carbonate may be converted to calcium oxide by heating in a conventional lime kiln into which additional fuel, such as oil or carbon monoxide-containing gas, may be incorporated. The calcium oxide thus produced may be combined with water thus forming an aqueous slurry of purified calcium hydroxide which is directed to be admixed with sulfur dioxide in the preparation of fresh cooking liquor.

The carbon dioxide-containing gas used in the carbonation stage may be obtained by burning noncondensable gases containing carbon monoxide which are separated from the condensed elemental sulfur. If desired, these noncondensable gases may be passed directly to the lime kiln to serve as supplemental fuel where they are burned to produce carbon dioxide-containing gas. Also, additional amount of carbon dioxide liberated from the lime kiln during the conversion of calcium carbonate to calcium oxide may be recycled into the carbonation zone.

If it is desired to increase the quantity of calcium compounds in the carbonaceous residue prior to its conversion into calcium carbide, a portion of the calcium oxide produced in the lime kiln referred to hereinabove may be admixed with the carbonaceous residue prior to its conversion to calcium carbide. As mentioned previously, the amount of calcium oxide added to the carbonaceous residue should be such as to provide a mixture containing an amount of carbon at least equivalent to that as required for the conversion of all of the calcium compounds present in the mixture into calcium carbide.

The volatile products liberated during pyrolysis of the sulfite spent liquor dry solids comprise a mixture of carbon monoxide, carbon dioxide, hydrogen, water vapor, and sulfur compounds. This mixture may be burned in an oxidizing atmosphere to produce a gas containing sulfur dioxide which may be directed to the mixing tank in which fresh sulfite cooking liquor is prepared while the heat from the combustion may be used to make process steam.

In the final step of the cyclic process of this invention, i.e. the preparation of fresh sulfite cooking liquor, it may sometimes be necessary to add a small amount of calcium oxide and sulfur dioxide to compensate for small mechanical losses of calcium and sulfur compounds incurred in the earlier recovery steps. This addition aids in maintaining proper chemical balance in the overall cyclic process and also permits minor adjustments in the composition of the sulfite cooking liquor utilized in the digestion of subsequent quantities of lignocellulose material.

For a more complete understanding of this invention, reference is made to the following illustrative examples in which percentages or parts are expressed by weight. Details of effectuating the various steps of evaporating, pyrolyzing, heating, burning, etc., as well as various methods of utilizing heat values are not included, inasmuch as such details are already described in prior art and known in the pulping or chemical industry.

*Example 1*

This example illustrates the process of this invention wherein the sulfite spent liquor solids alone are employed in the production of acetylene.

A calcium-base sulfite spent liquor obtained from pulping softwood chips with an acidic calcium-base sulfite liquor containing free $SO_2$ is separated from the cellulosic pulp. The spent liquor containing about 10% solids is concentrated in multiple effect evaporators to about 50% solids content, and then drum-dried to a moisture content of about 10%. 100 parts of the resulting solids contain 4.9 parts of calcium ion and 6.2 parts of sulfur ion. The solids are pyrolyzed in a muffle furnace in the presence of air at a temperature of 900° C. for a period of time sufficient to produce a carbonaceous residue in a yield of 16.9 parts. 4.7 parts sulfur in the form of sulfur compounds are contained in the volatile products which are released during pyrolysis. The solid residue contains 7.4 parts of $CaSO_4$, 3.8 parts of $CaO$, and 5.7 parts of carbon.

The carbonaceous residue is cooled and fed into an electric arc furnace in which a reaction temperature of about 2800° C. is maintained. The carbon reacts with the calcium compounds present in the residue to produce $CaC_2$ and a gaseous mixture containing CO, $CO_2$ and vaporous elemental sulfur. The yield of $CaC_2$ is 6.8 parts, corresponding to a 87% yield based on the original amount of calcium present in the residue. In addition, 0.5 part of CaS, 0.5 part of CaO, and 0.5 part of carbon remain admixed with the calcium carbide as impurities. The furnace gases contain 4.7 parts of CO, 2.4 parts of $CO_2$ and 1.5 parts of sulfur vapor. The calcium carbide thus produced is cooled to about 100° C., crushed into pieces of less than 2-inch length and fed into a conventional type acetylene generator together with 22.3 parts of cold water. During the reaction, precautions are taken to maintain the temperature at a value not exceeding 100° C. The reaction time is about 10 minutes. The yield of acetylene is 2.8 parts corresponding to 100% conversion of calcium carbide. The generated acetylene gas is withdrawn from the reaction zone and fed into suitable containers. An aqueous slurry of calcium hydroxide of about 30% solids content which is obtained as a co-product, contains a small amount of entrained carbon and CaS. This slurry is directed to a suitable mixing tank where it is admixed with $SO_2$ to produce fresh calcium-base sulfite cooking liquor. The resulting cooking liquor is filtered to remove the impurities, i.e. carbon and sulfur, the latter having been formed by the reaction between CaS and $SO_2$. The carbon and sulfur impurities are returned to the pyrolyzing zone. The volatile products from the pyrolyzing zone are burned to produce a gas containing 4.7 parts of sulfur in the form of $SO_2$, which is used in the preparation of the fresh cooking liquor. The sulfur-containing gas liberated from the calcium carbide stage contains 1.5 parts of vaporous sulfur. This gas is cooled to about 150° C. to condense sulfur which is separated and burned in a conventional sulfur burner in the presence of oxygen to give a gas containing about 16% $SO_2$. This gas is directed to the mixing tank where it is combined with the calcium hydroxide slurry. The amounts of $SO_2$ and the calcium hydroxide are implemented as necessary so as to produce a fresh acidic sulfite cooking liquor of a desired composition which is pumped to the digester for use in pulping of a new quantity of wood chips.

*Example 2*

This example illustrates the process of this invention wherein a portion of calcium oxide produced in the course of the recovery cycle is added to the carbonaceous residue formed during the pyrolysis of spent liquor solids.

The same calcium-base sulfite spent liquor as described in Example 1 is concentrated to about 50% solids and spray-dried to a moisture content of about 10%. 100 parts of the resulting solids containing 4.9 parts of calcium ion and 6.2 parts of sulfur ion are pyrolyzed in a retort-type furnace in the substantial absence of air, at a temperature of 900° C. for about 60 minutes to produce a carbonaceous residue in a yield of 46.2 parts. 4.5 parts of sulfur in the form of sulfur compounds are contained in the volatile products which are released from the pyrolyzing zone. These volatile products are burned in the presence of a slight excess of air to recover heat and to convert the sulfur compounds to $SO_2$. The resulting residue contains 4.3 parts of $CaSO_4$, 1.6 parts of CaS, 3.8 parts of CaO, and 36.5 parts of carbon. To this residue there is added 49.2 parts of CaO obtained from the previous recovery cycle, and the resulting mixture is heated in an electric arc furnace at a reaction temperature of about 2600° C. The carbon reacts with the calcium compounds present in the residue to produce $CaC_2$ and a gaseous mixture containing CO, $CO_2$, and vaporous elemental sulfur. The yield of calcium carbide is 55.6 parts, corresponding to a 87% yield, based on the amount of calcium originally present in the residue. In addition, 0.5 part of CaS, 6.9 parts of CaO, and 4.6 parts of carbon remain with the calcium carbide as impurities. The gases liberated from the heating zone contain 24.8 parts CO, 1.4 parts $CO_2$ and 1.5 parts of vaporous elemental sulfur. The calcium carbide is next reacted with 183 parts of water in the same manner as in Example 1, generating 22.6 parts of acetylene and producing an aqueous slurry of calcium hydroxide containing a small amount of carbon and CaS and having a solids content of about 30%. 12.3% of the slurry is directed to the mixing tank for preparation of calcium-base sulfite cooking liquor. The cooking liquor is filtered to remove the carbon and sulfur impurities which are returned to the pyrolyzing zone. The sources of sulfur for the fresh cooking liquor are the completely burned volatile products from the pyrolyzing zone which contain 4.5 parts of sulfur as $SO_2$ and the electric arc furnace gases furnishing 1.5 parts of vaporous sulfur which is condensed and burned in a conventional sulfur burner to give a gas containing about 16% $SO_2$.

The remaining 87.7% of the calcium hydroxide aqueous slurry from acetylene generating reactor is directed to a carbonation tank, where it is contacted with $CO_2$ from two sources, i.e. the carbide furnace gases, after sulfur removal and combustion to $CO_2$, and the gas from the kiln in which the calcium carbonate from the carbonation step is calcined to CaO. The carbonation releases 0.2 parts of $H_2S$ from the CaS present in the slurry. $H_2S$ is contacted in a reactor with 0.2 part of $SO_2$ to give 0.3 part of elemental sulfur, which is added to the sulfur burning system for its conversion to $SO_2$.

The recovered sulfur dioxide is combined with the recovered substantially pure calcium hydroxide aqueous slurry in the manner described in Example 1 thereby producing fresh calcium-base sulfite cooking liquor for use in the succeeding pulping cycle. If necessary, $SO_2$ and CaO may be added to the fresh liquor in amounts sufficient to compensate for mechanical losses occurring during pulping and recovery operations.

Accordingly, it will be apparent that by the present invention I have provided a process for the recovery of pulping chemicals from a calcium-base sulfite spent liquor with the concurrent production of calcium carbide or acetylene as valuable co-products of the process. As is well known, calcium carbide is useful in the manufacture of acetylene; it may also be employed in the manufacture of cyanamid. Acetylene is widely employed as a raw material in the manufacture of organic compounds, such as chloroprene, vinyl chloride, acetaldehyde, and others. It is also employed in welding or soldering using air-acetylene or oxy-acetylene flames.

The present process may easily and inexpensively be carried out on a large commercial scale. It does provide a practical means of converting a waste material, i.e. calcium-base sulfite spent liquor to commercially useful chemical products, while at the same time reusing inorganic pulping chemicals in the preparation of fresh cooking liquor.

The process of this invention has been described without reference to certain process conditions, such as pressure, flow rate, as well as to details pertaining to the equipment which may be employed in various stages thereof. Such details have not been included inasmuch as they are known in the prior art. The yield of calcium carbide and acetylene obtained from the process of this invention may vary with certain of these conditions and the purity of the starting materials employed. Accordingly, while reference to certain operating conditions has been made in the foregoing disclosure, it is to be understood that these conditions have been described to illustrate the operativeness of the present process and in no sense should be construed to limit the applicability or scope thereof.

It will be understood by those skilled in the art that reasonable variations and modifications are possible within the scope of the foregoing disclosure and the appended claims.

I claim:

1. In a cyclic process for regenerating fresh calcium-base sulfite cooking liquor from calcium-base sulfite spent liquor obtained from the calcium-base sulfite pulping process wherein the calcium compounds in said spent liquor are converted into calcium hydroxide, said calcium hydroxide being subsequently reacted with sulfur dioxide to produce said fresh cooking liquor for use in a succeeding pulping cycle, the improvement in the conversion of said calcium compounds into calcium hydroxide comprising:

evaporating said calcium-base sulfite spent liquor to produce substantially dry solids;

pyrolyzing the resulting dry solids at a temperature between about 700° C. to 1200° C. to release volatile products therefrom and to produce a solid carbonaceous residue comprising sulfur compounds, calcium compounds, and carbon, said pyrolysis being conducted for a time to produce said carbon in an amount that is at least equivalent to that stoichiometrically required to convert all of the calcium compounds to calcium carbide;

heating said carbonaceous residue in a reducing atmosphere at a temperature between about 2500° C. and 2900° C. to form calcium carbide and a gaseous mixture comprising vaporized elemental sulfur and carbon monoxide;

and reacting said calcium carbide with water to produce acetylene and calcium hydroxide, whereby said acetylene is recovered as a product and said calcium hydroxide is employed in producing said fresh calcium-base sulfite cooking liquor for use in said succeeding pulping cycle.

2. The process of claim 1 wherein said dry solids are pyrolyzed at a temperature between about 800° C. and about 1000° C.

3. The process of claim 1 wherein the amount of carbon in said carbonaceous residue is substantially equivalent to that stoichiometrically required for the conversion of said calcium compounds to calcium carbide.

4. The process of claim 1 wherein said carbonaceous residue is heated at a temperature between about 2700° C. and 2900° C.

5. The process of recovering chemicals from calcium-base sulfite spent liquor comprising: evaporating said spent liquor to produce substantially dry solids; pyrolyzing said solids at a temperature of between about 700° C. to 1200° C. to produce a solid carbonaceous residue comprising calcium compounds, sulfur compounds, and carbon, said pyrolysis being conducted for a time to produce said carbon in an amount at least stoichiometrically sufficient to convert all of the calcium compounds to calcium carbide; heating said carbonaceous residue at a temperature of between about 2500° C. and 2900° C. for a time sufficient to produce calcium carbide and a gaseous mixture containing vaporized elemental sulfur; and recovering said calcium carbide and said sulfur.

References Cited by the Examiner

UNITED STATES PATENTS 2,696,424   12/1954   Schoeffel _____ 23—131 X
2,845,329   7/1958    Neubauer et al. _____ 23—208 X

FOREIGN PATENTS 477,100   12/1937   Great Britain.

OTHER REFERENCES

Sillen et al.: article in Sevensk Papperstidning, vol. 55, No. 16½, Sept. 4, 1952, pp. 622–623.

MAURICE A. BRINDISI, *Primary Examiner.*